UNITED STATES PATENT OFFICE.

MATTHEW LAFLIN, OF CHICAGO, ILLINOIS.

IMPROVEMENT IN COLLECTING GOLD, SILVER, &c., FROM THEIR ORES.

Specification forming part of Letters Patent No. 161,129, dated March 23, 1875; application filed March 2, 1875.

*To all whom it may concern:*

Be it known that I, MATTHEW LAFLIN, of Chicago, in the county of Cook and State of Illinois, have invented certain new and useful Improvement in Collecting Gold, Silver, and other Metals from Ores; and I do hereby declare that the following is a full, clear, and exact description thereof, which will enable others skilled in the art to which it pertains to make and use the same.

In the usual process of collecting the precious metals by amalgamation there is great loss of both the precious metal and of the mercury used in amalgamation.

The object of my invention is to prevent, as far as possible, this loss; and the invention consists in mixing finely-pulverized charcoal, coke, or other form of carbon with the ore-pulp in the amalgamating-pan. This will keep the mercury clean, and prevent flouring, and will also brighten the particles of gold or other precious metal, and collect the fine particles, which in the ordinary method are carried away. As these fine particles frequently constitute a large, if not the largest, part of the metal, as shown by analysis or assay, the invention is very important.

When the ores contain sulphurets they should be prepared by roasting by any suitable process. A good method of removing sulphur is to burn or roast the ore in pits, as is now done, and then reburn in pans.

This latter operation I perform in the following manner: Take the roasted ore, and, if not sufficiently disintegrated, further reduce it by stamping, grinding, or otherwise; then mix with the ore about an equal bulk of pulverized charcoal, coke, or other carbon, and dampen the whole with a little water. The mixture is then placed in the pan, and brought to a red-heat, the whole being kept covered till this temperature is reached; then stir the mixture till all appearance of sulphur is gone.

The ores thus prepared, or such ores as are sufficiently free from sulphur without desulphurizing, are what I use in carrying out my invention, which I do as follows: Place the ore-pulp, mixed with water, in an amalgamating-pan, which can be heated so as to produce rapid boiling; add the quicksilver in the ordinary way, and mix in the finely-pulverized coke, charcoal, or other carbon; then boil and amalgamate in the ordinary way.

The mercury, by the operation of boiling, is projected upward through the ore-pulp and pulverized charcoal, and completely washes out and collects all the metals capable of amalgamating with it. It is kept bright, and will not be lost by flouring. The fine dust of gold and other metals which amalgamate is carried down with the mercury, and is removed from the pan in the usual way.

When silver ores are to be treated, the proper chloridizing process should be applied either as preliminary to or during the amalgamating process.

What I claim, and desire to secure by Letters Patent of the United States, is—

The process herein described for collecting gold, silver, and other metals from ores, grit, and the like, the same consisting in boiling the ore-pulp, mixed with pulverized charcoal, coke, and other carbon, in a pan or other vessel containing water and mercury, so as to collect the metal by amalgamation, substantially as specified.

In testimony that I claim the foregoing as my own I affix my signature in presence of two witnesses.

MATTHEW LAFLIN.

Witnesses:
    E. C. WEAVER,
    E. M. FINCH.